(12) United States Patent
Takahashi et al.

(10) Patent No.: US 12,031,201 B2
(45) Date of Patent: Jul. 9, 2024

(54) PLATED STEEL SHEET FOR HOT STAMPING

(71) Applicant: NIPPON STEEL CORPORATION, Tokyo (JP)

(72) Inventors: Takehiro Takahashi, Tokyo (JP); Daisuke Maeda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 51 days.

(21) Appl. No.: 17/614,623

(22) PCT Filed: May 29, 2020

(86) PCT No.: PCT/JP2020/021438
§ 371 (c)(1),
(2) Date: Nov. 29, 2021

(87) PCT Pub. No.: WO2020/241861
PCT Pub. Date: Dec. 3, 2020

(65) Prior Publication Data
US 2022/0228245 A1    Jul. 21, 2022

(30) Foreign Application Priority Data

May 31, 2019  (JP) ................... 2019-102314

(51) Int. Cl.
| | | |
|---|---|---|
| *C22C 18/00* | (2006.01) | |
| *B32B 15/01* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/20* | (2006.01) | |
| *C22C 38/22* | (2006.01) | |
| *C22C 38/24* | (2006.01) | |
| *C22C 38/26* | (2006.01) | |
| *C22C 38/28* | (2006.01) | |
| *C22C 38/32* | (2006.01) | |
| *C22C 38/60* | (2006.01) | |
| *C25D 3/22* | (2006.01) | |

(52) U.S. Cl.
CPC ............ *C22C 38/32* (2013.01); *B32B 15/013* (2013.01); *C22C 18/00* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/20* (2013.01); *C22C 38/22* (2013.01); *C22C 38/24* (2013.01); *C22C 38/26* (2013.01); *C22C 38/28* (2013.01); *C22C 38/60* (2013.01); *C25D 3/22* (2013.01)

(58) Field of Classification Search
CPC ....... C22C 18/00; C22C 38/001; C22C 38/02; C22C 38/04; C22C 38/06
USPC .......................................... 428/659
See application file for complete search history.

(56) References Cited

U.S. PATENT DOCUMENTS

| | | | |
|---|---|---|---|
| 2013/0122322 A1 | 5/2013 | Nakajima et al. | |
| 2013/0333436 A1* | 12/2013 | Nakajima ................ | C25D 5/14 72/342.1 |
| 2016/0151822 A1 | 6/2016 | Nakajima et al. | |
| 2017/0306437 A1 | 10/2017 | Nakagawa et al. | |
| 2019/0309396 A1 | 10/2019 | Kizu et al. | |
| 2020/0377978 A1* | 12/2020 | Yoshitomi ............... | B32B 15/04 |

FOREIGN PATENT DOCUMENTS

| | | |
|---|---|---|
| EP | 2 233 610 A1 | 9/2010 |
| EP | 2 684 985 A1 | 1/2014 |
| JP | 3-68793 A | 3/1991 |
| JP | 6-116781 A | 4/1994 |
| JP | 2009-127126 A | 6/2009 |
| JP | 2012-197505 A | 10/2012 |
| JP | 2012-233247 A | 11/2012 |
| JP | 2016-29214 A | 3/2016 |
| JP | 2016125101 A * | 7/2016 |
| JP | 2017-115191 A | 6/2017 |
| WO | WO 2015/001705 A1 | 1/2015 |
| WO | WO 2015/125887 A1 | 8/2015 |
| WO | WO 2016/063467 A1 | 4/2016 |

OTHER PUBLICATIONS

Akiba et al., JP 2016125101A Google Patents machine translation printed Apr. 13, 2023, Jul. 11, 2016, entire translation (Year: 2016).*
Calmet, "Annealing of cold rolled steel", Mar. 3, 2017, URL: <https://web.archive.org/web/20170303202030/https://www.calmet.com/annealing-of-cold-rolled-steel/>, pp. 1-2 (Year: 2017).*

* cited by examiner

*Primary Examiner* — Katherine A Christy
(74) *Attorney, Agent, or Firm* — Birch, Stewart, Kolasch & Birch, LLP

(57) ABSTRACT

The present invention relates to a plated steel sheet for hot stamping comprising a steel sheet and a Zn—Ni plating layer formed on at least one surface of the steel sheet, wherein the Zn—Ni plating layer has an Ni concentration of 8 mass % or more, a plating deposition amount of 10 g/m² or more and 90 g/m² or less per surface, and an average grain size of 50 nm or more, and a difference between a diffraction peak of the Zn—Ni plating layer after heat treating the plated steel sheet for hot stamping at 200° C. for 1 hour, and a diffraction peak of the Zn—Ni plating layer before heat treating it, is 0.3° or less.

3 Claims, No Drawings

PLATED STEEL SHEET FOR HOT STAMPING

FIELD

The present invention relates to a plated steel sheet for hot stamping, more specifically a plated steel sheet for hot stamping having a Zn—Ni plating layer.

BACKGROUND

In recent years, much use has been made of hot stamping (hot pressing) for shaping steel sheet used for automobile members. "Hot stamping" is the method of press-forming a steel sheet in a state heated to a temperature of the austenite region and quenching (cooling) the sheet by the press dies at the same time as shaping. It is one of the methods of shaping steel sheet excellent in strength and dimensional precision.

In the steel sheet used for hot stamping, sometimes the surface of the steel sheet is provided with a Zn—Ni plating layer. PTL 1 discloses a steel sheet for hot stamping, comprising sequentially on a surface of a base steel sheet: a plating layer I containing 60% by mass or more of Ni and the remainder consisting of Zn and inevitable impurities, a coating mass thereof being 0.01 to 5 g/m$^2$; and a plating layer II containing 10 to 25% by mass of Ni and the remainder consisting of Zn and inevitable impurities, a coating mass thereof being 10 to 90 g/m$^2$. Further, PTL 2 discloses a steel sheet for hot stamping comprising a base steel sheet; and a plating layer that is formed on a surface of the base steel sheet at a coating weight of 10 to 90 g/m$^2$ and contains 10 to 25% by mass of Ni and the balance Zn with inevitable impurities, wherein an η-phase content of the plating layer is 5 mass % or less. Furthermore, PTL 3 discloses a steel sheet for hot stamping having a coated layer such as a Zn—Ni plating layer on a surface thereof, wherein the melting point of the coated layer is not lower than 800° C. and a coating weight of the coated layer per side is from 10 to 90 g/m$^2$. Further, PTL 4 describes a method of manufacturing a hot-pressed member comprising: heating a coated steel sheet to 850° C. to 950° C., the coated steel sheet including a substrate steel sheet and a coating layer formed on the substrate steel sheet and containing 10% to 25% by mass of Ni and the balance being Zn and incidental impurities, in which the coating weight of the coating layer is 10 to 90 g/m$^2$ per a side; and starting hot press forming when the temperature of the coated steel sheet which has been heated is 650° C. to 800° C.

Regarding the Zn—Ni plating layer, PTLs 5 to 7 respectively teach to adjust the average grain size of the plating layer to thereby stably maintain the appearance after chromate treatment, improve the press formability, and improve the chemical convertibility.

CITATIONS LIST

Patent Literature

[PTL 1] Japanese Unexamined Patent Publication No. 2012-233247
[PTL 2] Japanese Unexamined Patent Publication No. 2016-29214
[PTL 3] Japanese Unexamined Patent Publication No. 2012-197505
[PTL 4] WO2015/001705
[PTL 5] Japanese Unexamined Patent Publication No. 2009-127126
[PTL 6] Japanese Unexamined Patent Publication No. 6-116781
[PTL 7] Japanese Unexamined Patent Publication No. 3-68793

SUMMARY

Technical Problem

A body (hot stamped body) obtained by hot stamping a plated steel sheet having a Zn—Ni plating layer on the steel sheet secures corrosion resistance by the Zn in the Zn—Ni plating layer. For example, even if a hot stamped body is scratched and the steel sheet is exposed, the Zn, which more readily corrodes compared with the Fe forming the steel sheet, has the action of corroding first to form a protective coating film and prevent corrosion of the steel sheet by the protective coating film (called a "sacrificial corrosion prevention action"). On the other hand, in hot stamping, since the plated steel sheet is heated to the temperature of the austenite region (for example, 900° C. or more), the Zn in the plating layer and the Fe in the steel sheet diffuse mutually at the time of the heating in the hot stamping. If Zn proceeds to diffuse into the steel sheet in this way, the Zn concentration in the Zn—Ni plating layer of the obtained hot stamped body will fall, the above sacrificial corrosion prevention action will not be sufficiently exhibited, and the corrosion resistance of the hot stamped body is liable to become insufficient.

In the steel sheet for hot stamping described in PTL 1, a Zn—Ni plating layer containing 60 mass % or more of Ni (plating layer I) is provided between the steel sheet surface and a Zn—Ni plating layer containing 10 to 25 mass % of Ni (plating layer II). The plating layer I is used to prevent diffusion of Zn from the surfacemost layer plating layer II to the underlying steel sheet. To obtain such a steel sheet for hot stamping, it is necessary to prepare plating baths having two different plating bath compositions. This is not desirable from the viewpoint of productivity.

In the steel sheet for hot stamping described in PTLs 2 and 3, suppression of diffusion of Zn into the steel sheet is not studied at all, diffusion of Zn into the steel sheet cannot be sufficiently prevented, and the corrosion resistance of the hot stamped body is liable to become insufficient. Further, PTL 4 teaches to prevent LME cracks by starting the hot press-forming at a predetermined temperature, but does not sufficiently study the constitution of a Zn—Ni plated steel sheet for preventing a drop in corrosion resistance due to the above-mentioned diffusion of Zn into the steel sheet.

The present invention was made in consideration of such an actual situation and has as its object to provide, by a novel constitution, a plated steel sheet for hot stamping able to suppress diffusion of Zn into a steel sheet and give a hot stamped body having improved corrosion resistance.

Solution to Problem

The inventors discovered that to effectively suppress diffusion of Zn in the Zn—Ni plating layer into the steel sheet at the time of hot stamping and obtain a hot stamped body having improved corrosion resistance, it is effective to reduce the residual strain (stress) in the Zn—Ni plating layer before hot stamping. As is known in the recrystallization of rolled metal sheets, if the strain in the metal structure is large, at the time of recrystallization of the metal structure by heating, atoms is easy to transfer due to easing of the strain, but if the strain is small, the atoms is hard to transfer. This applies to the diffusion of metal as well. If the residual strain (stress) in the Zn—Ni plating layer is small, diffusion of Zn from the Zn—Ni plating layer to the base metal steel sheet at the time of the heating in the hot stamping and diffusion of Fe from the base metal steel sheet to the Zn—Ni plating layer are sufficiently suppressed. If the diffusion of Zn into the steel sheet and the diffusion of Fe into the plating layer are suppressed, a sufficient Zn concentration can be left in the Zn—Ni plating layer of the hot stamped body and a hot stamped body having improved corrosion resistance can be obtained. Furthermore, the inventors discovered that to obtain a hot stamped body having improved corrosion resistance, in addition to controlling the residual strain in the Zn—Ni plating layer, it is effective to control the Ni concentration, plating deposition amount, and average grain size to predetermined ranges in the Zn—Ni plating layer before the hot stamping.

The present invention was made based on this discovery and has as its gist the following:

(1) A plated steel sheet for hot stamping comprising a steel sheet and a Zn—Ni plating layer formed on at least one surface of the steel sheet, wherein the Zn—Ni plating layer has an Ni concentration of 8 mass % or more, a plating deposition amount of 10 $g/m^2$ or more and 90 $g/m^2$ or less per surface, and an average grain size of 50 nm or more, and a difference between an angle of a maximum X-ray diffraction peak of the Zn—Ni plating layer, measured by X-ray diffraction analysis using Co-Kα-rays after heat treating the plated steel sheet for hot stamping at 200° C. for 1 hour, and an angle of a maximum X-ray diffraction peak of the Zn—Ni plating layer, measured by X-ray diffraction analysis using Co-Kα-rays before heat treating it, is 0.3° or less.

(2) The plated steel sheet for hot stamping according to (1), wherein the steel sheet comprises, by mass %,
C: 0.05% or more and 0.70% or less,
Mn: 0.5% or more and 11.0% or less,
Si: 0.05% or more and 2.00% or less,
Al: 0.001% or more and 1.500% or less,
P: 0.100% or less,
S: 0.100% or less,
N: 0.010% or less,
O: 0.010% or less,
B: 0% or more and 0.0040% or less,
Cr: 0% or more and 2.00% or less,
Ti: 0% or more and 0.300% or less,
Nb: 0% or more and 0.300% or less,
V: 0% or more and 0.300% or less,
Zr: 0% or more and 0.300% or less,
Mo: 0% or more and 2.000% or less,
Cu: 0% or more and 2.000% or less,
Ni: 0% or more and 2.000% or less,
Sb: 0% or more and 0.100% or less,
Ca: 0% or more and 0.0100% or less,
Mg: 0% or more and 0.0100% or less,
REM: 0% or more and 0.1000% or less, and
a balance of iron and impurities.

(3) The plated steel sheet for hot stamping according to (2), wherein the steel sheet comprises, by mass %, at least one selected from the group consisting of
B: 0.0005% or more and 0.0040% or less,
Cr: 0.01% or more and 2.00% or less,
Ti: 0.001% or more and 0.300% or less,
Nb: 0.001% or more and 0.300% or less,
V: 0.001% or more and 0.300% or less,
Zr: 0.001% or more and 0.300% or less,
Mo: 0.001% or more and 2.000% or less,
Cu: 0.001% or more and 2.000% or less,
Ni: 0.001% or more and 2.000% or less,
Sb: 0.001% or more and 0.100% or less,
Ca: 0.0001% or more and 0.0100% or less,
Mg: 0.0001% or more and 0.0100% or less, and
REM: 0.0001% or more and 0.1000% or less.

(4) The plated steel sheet for hot stamping according to any one of (1) to (3), wherein the plating deposition amount is 50 $g/m^2$ or more per surface.

Advantageous Effects of Invention

According to the present invention, it is possible to provide a plated steel sheet for hot stamping able to give a hot stamped body having improved corrosion resistance.

DESCRIPTION OF EMBODIMENTS

<Plated Steel Sheet for Hot Stamping>

The plated steel sheet for hot stamping according to the present invention comprises a steel sheet and a Zn—Ni plating layer formed on at least one surface of the steel sheet. Preferably, the Zn—Ni plating layer is formed on both surfaces of the steel sheet. Further, in the present invention, the Zn—Ni plating layer may be formed on the steel sheet or another plating layer may be provided between the steel sheet and the Zn—Ni plating layer.

[Steel Sheet]

The chemical composition of the steel sheet in the present invention is not particularly limited so long as the steel sheet can be used for hot stamping. Below, elements able to be contained in the steel sheet in the present invention will be explained. The "%" showing the contents of the elements in the chemical composition means mass % unless otherwise indicated.

Preferably, the steel sheet in the present invention can contain, by mass %, C: 0.05% or more and 0.70% or less, Mn: 0.5% or more and 11.0% or less, Si: 0.05% or more and 2.00% or less, Al: 0.001% or more and 1.500% or less, P: 0.100% or less, S: 0.100% or less, N: 0.010% or less, and O: 0.010% or less.

(C: 0.05% or More and 0.70% or Less)

C (carbon) is an element effective for improving the strength of the steel sheet. Automobile members for example, sometimes require high strengths of 980 MPa or more. To sufficiently secure strength, the C content is preferably 0.05% or more. On the other hand, if excessively containing C, sometimes the formability of the steel sheet falls, therefore the C content is preferably 0.70% or less. The lower limit of the C content is preferably 0.10%, more preferably 0.12%, still more preferably 0.15%, most preferably 0.20%. Further, the upper limit of the C content is preferably 0.65%, more preferably 0.60%, still more preferably 0.55%, most preferably 0.50%.

(Mn: 0.5% or More and 11.0% or Less)

Mn (manganese) is an element effective for improving the hardenability at the time of hot stamping. To reliably obtain this effect, the Mn content is preferably 0.5% or more. On the other hand, if excessively containing Mn, the Mn segregates and the strength, etc., of the body after hot stamping are liable to become uneven, therefore the Mn content is preferably 11.0% or less. The lower limit of the Mn content is preferably 1.0%, more preferably 2.0%, still more preferably 2.5%, even still more preferably 3.0%, most preferably 3.5%. The upper limit of the Mn content is preferably 10.0%, more preferably 9.5%, still more preferably 9.0%, even still more preferably 8.5%, most preferably 8.0%.

(Si: 0.05% or More and 2.00% or Less)

Si (silicon) is an element effective for improving the strength of the steel sheet. To sufficiently secure strength, the Si content is preferably 0.05% or more. On the other hand, if excessively containing Si, the formability sometimes falls, therefore the Si content is preferably 2.00% or less. The lower limit of the Si content is preferably 0.10%, more preferably 0.15%, still more preferably 0.20%, most preferably 0.30%. The upper limit of the Si content is preferably 1.80%, more preferably 1.50%, still more preferably 1.20%, most preferably 1.00%.

(Al: 0.001% or More and 1.500% or Less)

Al (aluminum) is an element acting as a deoxidizing element. To obtain the deoxidizing effect, the Al content is preferably 0.001% or more. On the other hand, if excessively containing Al, the formability is liable to fall, therefore the Al content is preferably 1.500% or less. The lower limit of the Al content is preferably 0.010%, more preferably 0.020%, still more preferably 0.050%, most preferably 0.100%. The upper limit of the Al content is preferably 1.000%, more preferably 0.800%, still more preferably 0.700%, most preferably 0.500%.

(P: 0.100% or Less)
(S: 0.100% or Less)
(N: 0.010% or Less)
(O: 0.010% or Less)

P (phosphorus), S (sulfur), N (nitrogen), and oxygen (O) are impurities and are preferably as low as possible, therefore lower limits of these elements are not particularly prescribed. However, the contents of these elements may be more than 0% or 0.001% or more. On the other hand, if excessively containing these elements, the toughness, ductility, and/or formability are liable to deteriorate, therefore the upper limits of P and S are preferably 0.100% and the upper limits of N and O are preferably 0.010%. The upper limits of P and S are preferably 0.080%, more preferably 0.050%. The upper limits of N and O are preferably 0.008%, more preferably 0.005%.

The basic chemical composition of the steel sheet in the present invention is as explained above. Furthermore, the steel sheet may, in accordance with need, contain at least one of the following optional elements in place of part of the balance of Fe. For example, the steel sheet may contain B: 0% or more and 0.0040% or less. Further, the steel sheet may contain Cr: 0% or more and 2.00% or less. Further, the steel sheet may contain at least one element selected from the group consisting of Ti: 0% or more and 0.300% or less, Nb: 0% or more and 0.300% or less, V: 0% or more and 0.300% or less, and Zr: 0% or more and 0.300% or less. Further, the steel sheet may contain at least one element selected from the group consisting of Mo: 0% or more and 2.000% or less, Cu: 0% or more and 2.000% or less, and Ni: 0% or more and 2.000% or less. Further, the steel sheet may contain Sb: 0% or more and 0.100% or less. Further, the steel sheet may contain at least one element selected from the group consisting of Ca: 0% or more and 0.0100% or less, Mg: 0% or more and 0.0100% or less, and REM: 0% or more and 0.1000% or less. Below, these optional elements will be explained in detail.

(B: 0% or More and 0.0040% or Less)

B (boron) is an element effective for improving the hardenability at the time of hot stamping. The B content may be 0%, but to reliably obtain this effect, the B content is preferably 0.0005% or more. On the other hand, if excessively containing B, the formability of the steel sheet is liable to fall, therefore the B content is preferably 0.0040% or less. The lower limit of the B content is preferably 0.0008%, more preferably 0.0010%, still more preferably 0.0015%. Further, the upper limit of the B content is preferably 0.0035%, more preferably 0.0030%.

(Cr: 0% or More and 2.00% or Less)

Cr (chromium) is an element effective for improving the hardenability at the time of hot stamping. The Cr content may be 0%, but to reliably obtain this effect, the Cr content is preferably 0.01% or more. The Cr content may be 0.10% or more, may be 0.50% or more, or may be 0.70% or more. On the other hand, if excessively containing Cr, the thermal stability of the steel material will sometimes fall. Therefore, the Cr content is preferably 2.00% or less. The Cr content may also be 1.50% or less, 1.20% or less, or 1.00% or less.

(Ti: 0% or More and 0.300% or Less)
(Nb: 0% or More and 0.300% or Less)
(V: 0% or More and 0.300% or Less)
(Zr: 0% or More and 0.300% or Less)

Ti (titanium), Nb (niobium), V (vanadium), and Zr (zirconium) are elements improving the tensile strength through refinement of the metal structure. The contents of these elements may be 0%, but to reliably obtain their effects, the Ti, Nb, V, and Zr contents are preferably 0.001% or more and may be 0.010% or more, 0.020% or more, or 0.030% or more. On the other hand, if excessively containing Ti, Nb, V, and Zr, the effects become saturated and the production costs rise. For this reason, the Ti, Nb, V, and Zr contents are preferably 0.300% or less and may be 0.150% or less, 0.100% or less, or 0.060% or less.

(Mo: 0% or More and 2.000% or Less)
(Cu: 0% or More and 2.000% or Less)
(Ni: 0% or More and 2.000% or Less)

Mo (molybdenum), Cu (copper), and Ni (nickel) have the actions of raising the tensile strength. The contents of these elements may be 0%, but to reliably obtain their effects, the Mo, Cu, and Ni contents are preferably 0.001% or more and may be 0.010% or more, 0.050% or more, or 0.100% or more. On the other hand, if excessively containing Mo, Cu, and Ni, the thermal stability of the steel material sometimes falls. Therefore, the Mo, Cu, and Ni contents are preferably 2.000% or less and may be 1.500% or less, 1.000% or less, or 0.800% or less.

(Sb: 0% or More and 0.100% or Less)

Sb (antimony) is an element effective for improving the wettability and adhesion of plating. The Sb content may also be 0%, but to reliably obtain this effect, the Sb content is preferably 0.001% or more. The Sb content may also be 0.005% or more, 0.010% or more, or 0.020% or less. On the other hand, if excessively containing Sb, sometimes a drop in the toughness is triggered. Therefore, the Sb content is preferably 0.100% or less. The Sb content may also be 0.080% or less, 0.060% or less, or 0.050% or less.

(Ca: 0% or More and 0.0100% or Less)
(Mg: 0% or More and 0.0100% or Less)
(REM: 0% or More and 0.1000% or Less)

Ca (calcium), Mg (magnesium), and REM (rare earth metals) are elements improving the toughness after hot stamping by adjusting the shapes of the inclusions. The contents of these elements may also be 0%, but to reliably obtain their effects, the Ca, Mg, and REM contents are preferably 0.0001% or more and may be 0.0010% or more, 0.0020% or more, or 0.0040% or more. On the other hand, if excessively containing Ca, Mg, and REM, the effects become saturated and the production costs rise. For this reason, the Ca and Mg contents are preferably 0.0100% or less and may be 0.0080% or less, 0.0060% or less, or 0.0050% or less. Similarly, the REM content is preferably 0.1000% or less and may be 0.0800% or less, 0.0500% or less, or 0.0100% or less.

The balance other than the above elements consists of iron and impurities. Here, the "impurities" include constituents entering during various factors in the production process such as the ore, scrap, or other raw materials when industrially producing the base metal steel sheet and not intentionally added to the base metal steel sheet in the present invention. Further, the "impurities" include elements which are other than the constituents explained above and which are contained in the base metal steel sheet at a level where the actions and effects unique to the elements do not affect the properties of the plated steel sheet for hot stamping according to the present invention.

The steel sheet in the present invention is not particularly limited. Hot rolled steel sheet, cold rolled steel sheet, and other general steel sheet can be used. Further, the steel sheet in the present invention may be any thickness so long as enabling formation of the later explained Zn—Ni plating layer on the steel sheet and the hot stamping. For example, it may be 0.1 to 3.2 mm.

[Zn—Ni Plating Layer]

The Zn—Ni plating layer in the present invention is a plating layer containing at least Zn and Ni. The other constituents are not particularly limited. For example, the Zn—Ni plating layer may be a plating layer having Zn as a main constituent (i.e., having a Zn concentration of 50 mass % or more) and having an Ni concentration of 8 mass % or more with the other constituents being not particularly limited. In that plating layer, the Zn and Ni are present with Ni dissolved in the Zn or with an intermetallic compound being formed by Zn and Ni. That plating layer may be formed by any plating method, but, for example, is preferably formed by electroplating. The Zn—Ni plating layer is formed on at least one surface of the steel sheet, preferably is formed on both surfaces of the steel sheet. Naturally, if hot stamping, Fe, etc., diffuse from the underlying steel sheet to the plating layer or Zn, etc., diffuse from the plating layer to the underlying steel sheet, therefore the chemical composition of the plating layer changes after the hot stamping in accordance with the heating conditions at the time of hot stamping (heating temperature, holding time, etc.)

(Ni Concentration)

In the Zn—Ni plating layer in the present invention, the lower limit of the Ni concentration is 8 mass %. By making the Ni concentration 8 mass % or more, oxidation of the Zn at the time of the heating in the hot stamping is suppressed, i.e., excessive formation of the zinc oxide ZnO is suppressed, whereby it is possible to make a sufficient concentration of Zn remain in the Zn—Ni plating layer after the hot stamping and to obtain a hot stamped body having a high corrosion resistance. If the Ni concentration becomes less than 8 mass %, formation of zinc oxide ZnO remarkably progresses at the time of heating in the hot stamping and the Zn concentration remaining in the Zn—Ni plating layer becomes insufficient after hot stamping and the corrosion resistance of the hot stamped body is liable to become insufficient. The lower limit of the Ni concentration is preferably 10 mass %, more preferably 12 mass %.

The upper limit of the Ni concentration is not particularly limited but from the viewpoint of economy is preferably 30 mass % or less. For example, the upper limit of the Ni concentration may be 28 mass %, 25 mass %, or 20 mass %.

The Zn—Ni plating layer in the present invention may further contain one or two or more of Fe, Cr, and Co. These elements may be intentionally added or may unavoidably enter in production. Further, the balance of the chemical composition of the Zn—Ni plating layer is Zn and impurities. In a specific embodiment of the present invention, the Zn—Ni plating layer contains, by mass %, Ni: 8% or more and 30% or less, one or two or more of Fe, Cr, and Co: 0% or more and 5% or less, and C: less than 1% and has a balance of iron and impurities. Preferably, the Zn—Ni plating layer contains, by mass %, Ni: 8% or more and 30% or less and has a balance of iron and impurities. The "impurities" in the Zn—Ni plating layer mean constituents, etc., entering due to various factors in the production process such as the raw materials when producing the Zn—Ni plating layer.

(Plating Deposition Amount)

In the Zn—Ni plating layer in the present invention, the lower limit of the plating deposition amount per surface of the steel sheet is 10 $g/m^2$. By making the plating deposition amount per surface 10 $g/m^2$ or more, it is possible to secure a plating layer of a sufficient thickness after the hot stamping and possible to obtain a hot stamped body having a high corrosion resistance. If the plating deposition amount per surface becomes less than 10 $g/m^2$, a thickness of the Zn—Ni plating layer for securing corrosion resistance will become insufficient and it is liable to become impossible to obtain a hot stamped body having improved corrosion resistance. The lower limit of the plating deposition amount per surface of the steel sheet is preferably 16 $g/m^2$, more preferably 20 $g/m^2$, still more preferably 24 $g/m^2$, even more preferably 30 $g/m^2$, particularly preferably 40 $g/m^2$, most preferably 50 $g/m^2$. In particular, if the plating deposition amount per surface of the steel sheet is 50 $g/m^2$ or more, a Zn—Ni plating layer of a sufficient thickness can be secured and the corrosion resistance of the hot stamped body is more improved, so this is preferable.

The upper limit of the plating deposition amount per surface of the steel sheet is not particularly prescribed, but from the viewpoint of economy, 90 $g/m^2$ is preferable. The upper limit of the plating deposition amount per surface of the steel sheet is preferably 80 $g/m^2$, more preferably 76 $g/m^2$, still more preferably 70 $g/m^2$, most preferably 60 $g/m^2$.

The Ni concentration of the Zn—Ni plating layer and the plating deposition amount in the present invention are measured by induction coupled plasma (ICP) spectroscopy. Specifically, the plating deposition amount in the present invention is found by dissolving the plating layer from the plated steel sheet having the Zn—Ni plating layer by 10% HCl and analyzing the obtained solution by ICP. The plating deposition amount in the present invention is the amount per surface, therefore if a Zn—Ni plating layer is formed at both surfaces of the steel sheet, the amounts of plating deposition of the two surfaces are calculated as being the same.

(Average Grain Size)

In the Zn—Ni plating layer of the present invention, the average grain size of the Zn—Ni plating is 50 nm or more. By making the average grain size 50 nm or more, at the time of the heating in the hot stamping, Zn in the Zn—Ni plating layer is hard to transfer whereby diffusion of Zn into the steel sheet can be effectively suppressed. This being so, it becomes possible to make a sufficient concentration of Zn remain in the plating layer after hot stamping, so it is possible to obtain a hot stamped body having improved corrosion resistance. If the average grain size becomes less than 50 nm, Zn in the Zn—Ni plating is easy to transfer at the time of the heating in the hot stamping and a relatively large amount of Zn is liable to diffuse into the steel sheet and the corrosion resistance of the hot stamped body is liable to become insufficient. The average grain size of the plating is preferably more than 50 nm, more preferably 55 nm or more or 60 nm or more, more preferably 70 nm or more.

The upper limit of the average grain size of the plating is not particularly prescribed, but, as explained later, to increase the average grain size, it is necessary to lower the current density at the time of electroplating, therefore from the viewpoint of productivity, the upper limit is preferably 300 nm, more preferably 250 nm, still more preferably 200 nm.

The average grain size of the Zn—Ni plating is measured by X-ray diffraction (XRD). Specifically, the full width at half maximum B of the diffraction peak measured by XRD using Co-Kα rays (tube voltage: 40 kV and tube current: 200 mA) is used to find it by the following Scherrer equation:

$$\text{Average grain size (nm)} = K\lambda/B \cos\theta \qquad (1)$$

(where K: Scherrer constant, λ: Co-Kα ray wavelength (nm), and θ is the Bragg angle (radian)). K is a value which changes according to the shape of the crystallites, but in the present invention, K may be 0.9.

As explained above, in the present invention, the average grain size of the Zn—Ni plating is 50 nm or more. A Zn—Ni plating having such a relatively large grain size can, for example, be obtained by electroplating by a relatively low current density (typically 150 A/dm² or less).

(Shift of Angle of Maximum X-Ray Diffraction Peak Before and After Heat Treatment)

The plated steel sheet for hot stamping according to the present invention has a difference of the angle (2θ) of the maximum X-ray diffraction peak of the Zn—Ni plating layer measured by X-ray diffraction analysis using Co-Kα rays after heat treatment at 200° C. for 1 hour and the angle (2θ) of the maximum X-ray diffraction peak of the Zn—Ni plating layer measured by X-ray diffraction analysis using Co-Kα rays before the heat treatment of 0.3° or less. The shift of the angle of the maximum X-ray diffraction peak of the Zn—Ni plating layer before and after heat treatment includes either case of a shift to the low angle side or a shift to the high angle side, i.e., means the absolute value of the difference of the angles of the maximum X-ray diffraction peak of the Zn—Ni plating layer before and after heat treatment is 0.3° or less. This is an indicator showing the extent of residual strain at the Zn—Ni plating layer. The smaller it is, the less residual strain there is in the Zn—Ni plating layer of the steel sheet for hot stamping according to the present invention. If the shift of the angle of the maximum X-ray diffraction peak before and after heat treatment is 0.3° or less, there is little strain remaining in the Zn—Ni plating layer, the Zn of the Zn—Ni plating layer is hard to transfer at the time of the heating in the hot stamping, and diffusion of Zn into the steel sheet and diffusion of Fe into the plating layer can be suppressed. If the shift of the angle of the maximum X-ray diffraction peak before and after heat treatment is more than 0.3°, there is a relatively large strain present in the Zn—Ni plating layer, the Zn of the Zn—Ni plating layer is easy to transfer at the time of the heating in the hot stamping, and diffusion of Zn into the steel sheet is liable to be unable to be sufficiently suppressed. The shift of the angle of the maximum X-ray diffraction peak before and after heat treatment is preferably 0.2° or less.

The smaller the shift of the angle of the maximum X-ray diffraction peak before and after heat treatment, the better, therefore the lower limit is not particularly prescribed. For example, it may be more than 0° or 0.1° or more.

The shift of the angle of the maximum X-ray diffraction peak before and after heat treatment in the present invention is measured as explained above by the X-ray diffraction (XRD) method. Specifically, the Zn—Ni plating layer of the plated steel sheet for hot stamping according to the present invention is measured for the angle (2θ) of the maximum X-ray diffraction peak by XRD using Co-Kα rays. Similarly the Zn—Ni plating layer after heat treating the plated steel sheet at 200° C. for 1 hour is measured for the angle (2θ) of the maximum X-ray diffraction peak by XRD using Co-Kα rays. Next, the angles of the maximum X-ray diffraction peak before and after heat treatment are compared and the shift of the angle of the maximum X-ray diffraction peak before and after heat treatment is determined. The heat treatment is performed by an annealing furnace. The atmosphere in the furnace is a nitrogen atmosphere for preventing oxidation. As the measurement conditions, voltage: 45 kV, current: 40 mA, measurement angle: 10° to 90°, slit: ½°, step size: 0.1°, and incident angle: 2° are used.

The Zn—Ni plating layer of the plated steel sheet for hot stamping according to the present invention has a shift of the angle of the maximum X-ray diffraction peak before and after heat treatment of 0.3° or less. Therefore, the strain remaining at the Zn—Ni plating layer is small. To obtain such a Zn—Ni plating layer, for example, it is preferable to perform heat treatment by an annealing furnace (BAF) or any other furnace before the hot stamping. The heat treatment temperature may be 150 to 250° C. If the heat treatment temperature is too low, the strain of the Zn—Ni plating layer cannot be sufficiently eased, while if it is too high, the metal structures of the steel sheet and plating layer are liable to change. The duration of the heat treatment may be 1 to 48 hours and is preferably 2 to 12 hours. If the duration of the heat treatment is too short (for example, several minutes or so), sometimes the strain cannot be sufficiently eased. Further, for example, the heat treatment atmosphere is a nitrogen atmosphere containing 1 to 10% hydrogen from the viewpoint of preventing oxidation of the Zn—Ni plating layer, etc. The rate of temperature rise to the above heat treatment temperature may be 20 to 100° C./h.

(Tensile Strength)

The plated steel sheet for hot stamping according to the present invention can have any suitable tensile strength. Plated steel sheet for hot stamping having any suitable tensile strength can be given improved corrosion resistance by suppressing diffusion of Zn into the steel sheet at the time of the heating in the hot stamping. Therefore, the tensile strength, while not particularly limited, may be for example 440 MPa or more, 590 MPa or more, or 780 MPa or more and/or may be 1470 MPa or less, 1320 MPa or less, 1180 MPa or less, 1100 MPa or less, or 980 MPa or less. The tensile strength is measured by taking a JIS No. 5 tensile test piece from a direction perpendicular to the rolling direction of the steel sheet and subjecting it to a tensile test based on JIS Z2241 (2011).

The above such plated steel sheet having the Zn—Ni plating layer on the steel surface can be used for hot stamping under any conditions known to persons skilled in the art. The heating system of the hot stamping is not limited, but, for example, furnace heating, ohmic heating, induction heating, etc., may be mentioned. Further, the heating temperature at the time of hot stamping may be any temperature so long as heating the steel sheet to the austenite region in accordance with the chemical composition of the steel sheet and is, for example, 800° C. or more, 850° C. or more, 900° C. or more, or 950° C. or more. The plated steel sheet can be heated to the austenite region by the above such heating system, then shaped by the press dies and quenched. After heating, the steel sheet may be cooled after holding it at that temperature for 1 to 10 minutes or need not be held nor cooled. Further, the quenching (cooling) can be performed by a cooling rate of 1 to 100° C./s.

If using the plated steel sheet for hot stamping according to the present invention, at the time of the heating in the hot stamping, the Zn in the Zn—Ni plating layer is hard to transfer and diffusion of Zn into the steel sheet can be prevented. For this reason, it becomes possible to make a sufficient concentration of Zn remain at the Zn—Ni plating layer after the hot stamping and as a result possible to obtain a hot stamped body excellent in corrosion resistance.

[Method of Production of Plated Steel Sheet for Hot Stamping]

An example of the method of production of the plated steel sheet for hot stamping according to the present invention will be explained below. The plated steel sheet for hot stamping according to the present invention can be obtained by forming a Zn—Ni plating layer on at least one surface of a steel sheet, preferably both surfaces, by for example electroplating.

(Production of Steel Sheet)

The method of production of the steel sheet used for producing the plated steel sheet for hot stamping according to the present invention is not particularly limited. For example, it is possible to adjust the chemical composition of the molten steel to the desired ranges and hot roll, coil, and cold roll the steel to thereby obtain a steel sheet. The thickness of the steel sheet in the present invention may, for example, be 0.1 mm to 3.2 mm.

The chemical composition of the steel sheet used is not particularly limited, but, as explained above, the steel sheet preferably contains, by mass %, C: 0.05% or more and 0.70% or less, Mn: 0.5% or more and 11.0% or less, Si: 0.05% or more and 2.00% or less, Al: 0.001% or more and 1.500% or less, P: 0.100% or less, S: 0.100% or less, N: 0.010% or less, and O: 0.010% or less and has a balance of iron and impurities. Further, the steel sheet may further contain, by mass %, at least one selected from the group comprising B: 0.0005% or more and 0.0040% or less, Cr: 0.01% or more and 2.00% or less, Ti: 0.001% or more and 0.300% or less, Nb: 0.001% or more and 0.300% or less, V: 0.001% or more and 0.300% or less, Zr: 0.001% or more and 0.300% or less, Mo: 0.001% or more and 2.000% or less, Cu: 0.001% or more and 2.000% or less, Ni: 0.001% or more and 2.000% or less, Sb: 0.001% or more and 0.100% or less, Ca: 0.0001% or more and 0.0100% or less, Mg: 0.0001% or more and 0.0100% or less, and REM: 0.0001% or more and 0.1000% or less.

(Formation of Zn—Ni Plating Layer)

The method for formation of the Zn—Ni plating layer in the present invention is not particularly limited so long as the Ni concentration, plating deposition amount, and average grain size according to the present invention are obtained, but electroplating can be used to form it. In particular, to obtain a relatively large grain size Zn—Ni plating, it is preferable to perform the electroplating by a relatively low current density, for example, it is possible to perform electroplating by 150 A/dm$^2$ or less, 100 A/dm$^2$ or less, or 70 A/dm$^2$ or less. The lower limit of the current density is not particularly limited, but from the viewpoint of the productivity may be 10 A/dm$^2$ or 20 A/dm$^2$. On the other hand, if performing the electroplating by 280 A/dm$^2$ or more, the average grain size is liable to become 50 nm or less. The composition of the bath used for forming the Zn—Ni plating layer may, for example, be nickel sulfate hexahydrate: 150 to 350 g/liter, zinc sulfate heptahydrate: 10 to 150 g/liter, and sodium sulfate: 25 to 75 g/liter.

The plating bath can for example be adjusted to a pH of 2.0 or less, 1.5 or less, or 1.0 or less using for example sulfuric acid. Further, the temperature of the plating bath may for example be 45° C. or more, 50° C. or more, or 55° C. or more.

If using electroplating to produce the plated steel sheet for hot stamping according to the present invention, it is possible to suitably change the current density, bath composition, and conduction time at the time of the electroplating so as to adjust the Ni concentration of the Zn—Ni plating layer, the plating deposition amount, and the average grain size. More specifically, the Ni concentration can be adjusted by changing the current density and bath composition, the plating deposition amount by changing the current density and conduction time, and the grain size by changing the current density.

As explained above, after forming a Zn—Ni plating layer on a steel sheet by electroplating, to ease the strain of the plating layer, for example heat treatment may be performed by an annealing furnace (BAF) or any other furnace. The heat treatment temperature may be 150 to 250° C. If the heat treatment temperature is too low, the strain of the Zn—Ni plating layer cannot be sufficiently eased, while if too high, the metal structures of the steel sheet and plating layer are liable to change. The time of the heat treatment may be 1 to 48 hours, preferably is 2 to 12 hours. Further, for example, the atmosphere of the heat treatment is preferably a reducing atmosphere containing hydrogen from the viewpoint of preventing oxidation of the Zn—Ni plating layer, more specifically it is a nitrogen atmosphere containing 1 to 10% of hydrogen. The rate of temperature rise up to this heat treatment temperature may be 20 to 100° C./h. Ni is reduced in a relatively low temperature hydrogen-containing atmosphere, so it is believed that the oxidation of Zn is suppressed by the Ni reduced in that hydrogen-containing atmosphere. In addition, due to the heat treatment in such a hydrogen-containing atmosphere, it is possible to ease the strain (stress) remaining in the Zn—Ni plating layer before hot stamping and therefore possible to obtain the above-mentioned plated steel sheet for hot stamping according to the present invention having a shift of the angle of the maximum X-ray diffraction peak before and after heat treatment at 200° C. for 1 hour of 0.3° or less.

Examples

The plated steel sheet for hot stamping according to the present invention will be explained in more detail below while giving several examples. However, it is not intended that the scope of the invention described in the claims be limited by the specific examples explained below.

[Preparation of Samples of Plated Steel Sheet for Hot Stamping]

A thickness 1.4 mm cold rolled steel sheet was dipped in a plating bath having the following bath composition and electroplated to form a Zn—Ni plating layer on both surfaces of that cold rolled steel sheet and thereby obtain each of Sample Nos. 1 to 13 of plated steel sheet for hot stamping. All of the steel sheets used contained, by mass %, C: 0.50%, Mn: 3.0%, Si: 0.50%, Al: 0.100%, P: 0.010%, S: 0.020%, N: 0.003%, O: 0.003%, and B: 0.0010% and had a balance of iron and impurities.

Plating Bath Composition
nickel sulfate hexahydrate: 250 g/liter (fixed)
zinc sulfate heptahydrate: 10 to 150 g/liter (variable)
sodium sulfate: 50 g/liter (fixed)

The pH of the bath was 1.5 using sulfuric acid, and the bath temperature was maintained at 50° C. Sample No. 8 was plated by a high current density (300 A/dm²), therefore to prevent plating burns, the pH of the bath was 1.0 and the bath temperature was maintained at 70° C. The current density and the conduction time were adjusted to obtain the desired plating deposition amount and average grain size of the Zn—Ni plating. Further, to obtain the desired Ni concentration, the concentration of the zinc sulfate heptahydrate was suitably adjusted based on the set current density. The current densities set for producing the samples are shown in Table 1.

The Ni concentrations and the amounts of plating deposition per surface of the samples obtained by the electroplating were determined by ICP analysis. Specifically, 10% HCl was used to dissolve just the plating layers from the samples and the obtained solutions were analyzed by ICP to find the Ni concentrations and the amounts of plating deposition per surface. The Ni concentrations and the amounts of plating deposition per surface of the samples are shown in Table 1.

The average grain size of the Zn—Ni plating layer was determined by XRD. First, the XRD of each sample using Co-Kα rays (tube voltage: 40 kV and tube current: 200 mA) was used to find the full width at half maximum B of the diffraction peak. Further, using the found full width at half maximum B, the following Scherrer equation:

$$\text{Average grain size (nm)} = K\lambda/B \cos\theta \quad (1)$$

was used to calculate the average grain size (where K: Scherrer constant=0.9, λ: Co-Kα ray wavelength (nm), and θ is the Bragg angle (radian)). Here, the Co-Kα ray wavelength λ=0.179 nm and the Bragg angle θ was the angle of the diffraction line recognized in the range of 50.1 to 50.3°. The average grain sizes of the samples are shown in Table 1.

In Sample Nos. 1 to 9, 12, and 13, after forming the Zn—Ni plating layer, heat treatment was performed in an annealing furnace (BAF) with a nitrogen atmosphere containing 4% hydrogen at a temperature of 200° C. for 4 hours (240 minutes). The rate of temperature rise was 50° C./h. After holding for 4 hours, the samples were gradually cooled for 12 hours and taken out from the annealing furnace. In Sample No. 10, the above heat treatment was not performed after forming the Zn—Ni plating layer. In Sample No. 11, the sample was heated for 1 minute to 200° C. and immediately water cooled. The "heat treatment temperature" and "holding time" in Table 1 respectively show the temperature and duration of the heat treatment.

Next, the Zn—Ni plating layers in Sample Nos. 1 to 13 were measured for angles of maximum X-ray diffraction peaks by XRD using Co-Kα rays. Further, Sample Nos. 1 to 13 were heat treated in an annealing furnace at 200° C. for 1 hour, then the Zn—Ni plating layers were again measured for angles of maximum X-ray diffraction peaks by XRD using Co-Kα rays. From the measured angles of maximum X-ray diffraction peaks before and after the heat treatment, the amounts of shift of the maximum X-ray diffraction peaks were calculated. In the samples, an angle 2θ of the maximum X-ray diffraction peak was observed near 50.1 to 50.3°. That peak was a peak due to the Γ-phase of the Ni—Zn. The amounts of shift of the maximum X-ray diffraction peaks of the samples are shown in Table 1. As the measurement conditions, voltage: 45 kV, current: 40 mA, measurement angle: 10° to 90°, slit: ½°, step size: 0.1°, and incident angle: 2° were used.

[Evaluation of Plated Steel Sheet for Hot Stamping]

Sample Nos. 1 to 13 of the plated steel sheet for hot stamping obtained as explained above were hot stamped. The hot stamping was performed by raising the temperature of the sheet up to 900° C. in an air furnace, holding it for 4 minutes, then using tip R: 3 mm V-bending dies to shape and quench it (cooling rate: 50° C./s). The obtained hot stamped bodies were subjected to a salt spray test (based on the JASO M609-91 method) as a test for evaluation of the corrosion resistance. This salt spray test was conducted for a total of six cycles (total 48 hours) of cycles of (1) salt water spraying for 2 hours (5% NaCl, 35° C.); (2) drying for 4 hours (60° C.); and (3) wetting for 2 hours (50° C., humidity 95% or more). To prevent corrosion from the end faces, the end faces of the samples were sealed by tape for the test. The samples were widths of 50 mm and lengths of 100 mm.

The corrosion resistance was evaluated by examination by an optical microscope of a flat part of a sample after 48 hours of a salt spray test and determination of the area rate Z of rust formation. Specifically, first, the surface of the sample was read by a scanner. After that, image editing software was used to select the regions where rust was formed and find the area rate of rust formation. This procedure was performed on five samples. The "area rate Z of rust formation" was determined by averaging the area rates of rust formation. Cases where Z<10% were evaluated as "very good in corrosion resistance", cases where 10%≤Z≤30% were evaluated as "good in corrosion resistance", and cases where Z>30% were evaluated as "poor in corrosion resistance". The results are shown in Table 1.

TABLE 1

[Properties of Plated Steel Sheet For Hot Stamping and Results of Evaluation]

| Sample no. | Current density (A/dm²) | Ni conc. (mass %) | Amount of deposition (per surface) (g/m²) | Plating average grain size (nm) | Heat treatment temp. (° C.) | Holding time (min) | Maximum X-ray diffraction peak angle shift (°) | Evaluation of corrosion resistance | Remarks |
|---|---|---|---|---|---|---|---|---|---|
| 1 | 70 | 12 | 10 | 100 | 200 | 240 | 0.1 | Good | Ex. |
| 2 | 70 | 12 | 30 | 100 | 200 | 240 | 0.1 | Good | Ex. |
| 3 | 70 | 12 | 60 | 100 | 200 | 240 | 0.2 | Very good | Ex. |
| 4 | 70 | 12 | 90 | 100 | 200 | 240 | 0.1 | Very good | Ex. |
| 5 | 70 | 12 | 5 | 100 | 200 | 240 | 0.2 | Poor | Comp. ex. |
| 6 | 100 | 12 | 60 | 200 | 200 | 240 | 0.1 | Very good | Ex. |
| 7 | 150 | 12 | 60 | 50 | 200 | 240 | 0.1 | Good | Ex. |
| 8 | 300 | 12 | 60 | 47 | 200 | 240 | 0.2 | Poor | Comp. ex. |
| 9 | 70 | 5 | 60 | 120 | 200 | 240 | 0.1 | Poor | Comp. ex. |
| 10 | 70 | 12 | 60 | 100 | — | — | 0.5 | Poor | Comp. ex. |
| 11 | 70 | 12 | 60 | 100 | 200 | 1 | 0.4 | Poor | Comp. ex. |

TABLE 1-continued

[Properties of Plated Steel Sheet For Hot Stamping and Results of Evaluation]

| Sample no. | Current density (A/dm$^2$) | Ni conc. (mass %) | Amount of deposition (per surface) (g/m$^2$) | Plating average grain size (nm) | Heat treatment temp. (° C.) | Holding time (min) | Maximum X-ray diffraction peak angle shift (°) | Evaluation of corrosion resistance | Remarks |
|---|---|---|---|---|---|---|---|---|---|
| 12 | 100 | 8 | 60 | 200 | 200 | 240 | 0.1 | Good | Ex. |
| 13 | 100 | 16 | 60 | 200 | 200 | 240 | 0.1 | Very good | Ex. |

In Sample Nos. 1 to 4, 6, 7, 12, and 13 of the plated steel sheet for hot stamping according to the present invention, the corrosion resistance of the hot stamped body was excellent. In particular, in Sample Nos. 3, 4, 6, and 13, the Ni concentration was 10 mass % or more and the plating deposition amount per surface was 50 g/m$^2$ or more, a Zn—Ni plating layer of a sufficient Ni concentration and sufficient thickness could be secured, and the corrosion resistance was better.

In Sample No. 5, the corrosion resistance of the hot stamped body was insufficient. This is believed to be because the plating deposition amount was insufficient, the Zn—Ni plating layer was thin, and the thickness was insufficient for that plating layer to impart corrosion resistance.

In Sample No. 8, the corrosion resistance of the hot stamped body was insufficient. This is believed to be because the current density at the time of the electroplating was high and the plating grain size was small, so diffusion of Zn into the steel sheet at the time of the heating in hot stamping could not be suppressed.

In Sample No. 9, the corrosion resistance of the hot stamped body was insufficient. This is believed to be because the initial Ni concentration before hot stamping was low, a large amount of Zn was oxidized to ZnO at the time of the heating in the hot stamping, and the Zn concentration of the plating layer fell after the hot stamping.

In Sample Nos. 10 and 11, the corrosion resistance of the hot stamped body was insufficient. This is believed to be because the shift in the diffraction peak was large, i.e., the strain remaining in the plating layer was large, and diffusion of Zn into the steel sheet could not be sufficiently suppressed at the time of the heating in the hot stamping.

INDUSTRIAL APPLICABILITY

According to the present invention, it is possible to provide plated steel sheet for hot stamping able to secure improved corrosion resistance after hot stamping and thereby possible to provide a hot stamped body excellent in corrosion resistance able to be suitably used for members for automobile use. Therefore, the present invention can be said to be an invention with an extremely high value in industry.

The invention claimed is:

1. A plated steel sheet for hot stamping comprising a steel sheet and a Zn—Ni plating layer formed on at least one surface of the steel sheet, wherein the Zn—Ni plating layer has an Ni concentration of 8 mass % or more, a Zn concentration of 50 mass % or more, a plating deposition amount of 10 g/m$^2$ or more and 90 g/m$^2$ or less per surface, and an average grain size of the Zn—Ni plating of 50 nm or more, and a difference between an angle of a maximum X-ray diffraction peak of the Zn—Ni plating layer, measured by X-ray diffraction analysis using Co-Kα-rays after heat treating the plated steel sheet for hot stamping at 200° C. for 1 hour, and an angle of a maximum X-ray diffraction peak of the Zn—Ni plating layer, measured by X-ray diffraction analysis using Co-Kα-rays before heat treating the plated steel sheet, is 0.3° or less, wherein the steel sheet comprises, by mass %,
C: 0.05% or more and 0.70% or less,
Mn: 0.5% or more and 11.0% or less,
Si: 0.05% or more and 2.00% or less,
Al: 0.001% or more and 1.500% or less,
P: greater than 0% to 0.100% or less,
S: greater than 0% to 0.100% or less,
N: greater than 0% to 0.010% or less,
O: greater than 0% to 0.010% or less,
B: 0% or more and 0.0040% or less,
Cr: 0% or more and 2.00% or less,
Ti: 0% or more and 0.300% or less,
Nb: 0% or more and 0.300% or less,
V: 0% or more and 0.300% or less,
Zr: 0% or more and 0.300% or less,
Mo: 0% or more and 2.000% or less,
Cu: 0% or more and 2.000% or less,
Ni: 0% or more and 2.000% or less,
Sb: 0% or more and 0.100% or less,
Ca: 0% or more and 0.0100% or less,
Mg: 0% or more and 0.0100% or less,
REM: 0% or more and 0.1000% or less, and
a balance of iron and impurities.

2. The plated steel sheet for hot stamping according to claim 1, wherein the steel sheet comprises, by mass %, at least one selected from the group consisting of
B: 0.0005% or more and 0.0040% or less,
Cr: 0.01% or more and 2.00% or less,
Ti: 0.001% or more and 0.300% or less,
Nb: 0.001% or more and 0.300% or less,
V: 0.001% or more and 0.300% or less,
Zr: 0.001% or more and 0.300% or less,
Mo: 0.001% or more and 2.000% or less,
Cu: 0.001% or more and 2.000% or less,
Ni: 0.001% or more and 2.000% or less,
Sb: 0.001% or more and 0.100% or less,
Ca: 0.0001% or more and 0.0100% or less,
Mg: 0.0001% or more and 0.0100% or less, and
REM: 0.0001% or more and 0.1000% or less.

3. The plated steel sheet for hot stamping according to claim 1, wherein the lower limit of the plating deposition amount is 50 g/m$^2$ per surface.

* * * * *